United States Patent
Lin

(10) Patent No.: US 10,657,047 B2
(45) Date of Patent: May 19, 2020

(54) DATA STORAGE DEVICE AND METHOD OF PERFORMING PARTIAL GARBAGE COLLECTION

(71) Applicant: Silicon Motion, Inc., Jhubei (TW)

(72) Inventor: Sheng-Hsun Lin, Magong (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 16/026,917

(22) Filed: Jul. 3, 2018

(65) Prior Publication Data
US 2019/0220396 A1  Jul. 18, 2019

(30) Foreign Application Priority Data
Jan. 18, 2018 (TW) .............................. 107101841 A

(51) Int. Cl.
*G06F 12/02* (2006.01)
*G06F 12/1009* (2016.01)

(52) U.S. Cl.
CPC ...... *G06F 12/0253* (2013.01); *G06F 12/0246* (2013.01); *G06F 12/1009* (2013.01); *G06F 2212/1044* (2013.01); *G06F 2212/152* (2013.01); *G06F 2212/2022* (2013.01); *G06F 2212/657* (2013.01)

(58) Field of Classification Search
CPC ......... G06F 12/0246; G06F 2212/7201; G06F 3/0679; G06F 3/064; G06F 2212/7203; G06F 2212/7205; G06F 3/061; G06F 3/0688; G06F 12/0253; G06F 2212/202
See application file for complete search history.

(56) References Cited

U.S. PATENT DOCUMENTS

| | | | |
|---|---|---|---|
| 8,762,627 B2 | 6/2014 | Sela | |
| 9,852,066 B2 | 12/2017 | Shaharabany et al. | |
| 2007/0150691 A1* | 6/2007 | Illendula | G06F 12/0246 711/170 |
| 2013/0166822 A1* | 6/2013 | Franceschini | G06F 3/0601 711/103 |
| 2014/0075095 A1* | 3/2014 | Manohar | G06F 12/0246 711/103 |
| 2014/0101369 A1* | 4/2014 | Tomlin | G06F 12/0246 711/103 |

FOREIGN PATENT DOCUMENTS

| | | |
|---|---|---|
| CN | 106610904 A | 5/2017 |
| TW | 201716980 A | 5/2017 |
| TW | I609323 B | 12/2017 |

* cited by examiner

*Primary Examiner* — Reginald G Bragdon
*Assistant Examiner* — Thanh D Vo
(74) *Attorney, Agent, or Firm* — Wang Law Firm, Inc.

(57) ABSTRACT

A data storage device is provided. The data storage device includes: a flash memory and a microcontroller. The flash memory includes a plurality of physical blocks. The microcontroller selects one source block and one destination block from the plurality of physical blocks, and performs a garbage collection operation according to a check map corresponding to the selected source block to copy data stored in one or more valid physical addresses of the source block to the selected destination block.

16 Claims, 9 Drawing Sheets

DATA STORAGE DEVICE AND METHOD OF PERFORMING PARTIAL GARBAGE COLLECTION

CROSS REFERENCE TO RELATED APPLICATIONS

This Application claims priority to Taiwan Patent Application No. 107101841, filed on Jan. 18, 2018, the entirety of which is incorporated by reference herein.

BACKGROUND OF THE INVENTION

Field of the Invention

The present invention relates to data storage devices and in particular to garbage collection therefor.

Description of the Related Art

There are various forms of non-volatile memory used in data storage devices for long-term data retention. These include flash memory, magnetoresistive RAM, ferroelectric RAM, resistive RAM, spin transfer torque-RAM (STT-RAM), and so on.

When a non-volatile memory is utilized in data storage, a garbage collection operation is usually performed in which blocks with no valid data left can be erased and reused to store data. The physical structure of the blocks allocated in a non-volatile memory is becoming more and more complex as the capacity for data storage grows. How to efficiently perform a garbage collection operation without dragging down the efficiency of system resources is an important issue.

BRIEF SUMMARY OF THE INVENTION

In an exemplary embodiment, a data storage device is provided. The data storage device includes: a flash memory and a microcontroller. The flash memory includes a plurality of physical blocks. The microcontroller selects one source block and one destination block from the plurality of physical blocks, and performs a garbage collection operation according to a check map corresponding to the selected source block to copy data stored in one or more valid physical addresses of the source block to the selected destination block.

In another exemplary embodiment, a data storage device is provided. The data storage device includes: a flash memory and a microcontroller. The flash memory includes a plurality of physical blocks. The microcontroller selects one source block and one destination block from the plurality of physical blocks, and divides the source block into a plurality of virtual blocks. The microcontroller selects one of the virtual blocks, and performs a garbage collection operation according to a check map corresponding to the selected virtual block to copy data stored in one or more valid physical addresses of the virtual block to the selected destination block.

In yet another exemplary embodiment, a data storage device is provided. The data storage device includes: a flash memory and a microcontroller. The flash memory includes a plurality of physical blocks. The microcontroller selects one source block and one destination block from the plurality of physical blocks, and divides the source block into a plurality of virtual blocks. The microcontroller selects one of the virtual blocks, and reads a virtual valid data count of the selected virtual block. When the microcontroller determines that the virtual valid data count of the selected virtual block is equal to a maximum storage size of the selected virtual block, the microcontroller performs a garbage collection operation to copy data, stored in a plurality of physical addresses of the selected virtual block, to the selected destination block.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

A non-volatile memory may be a memory device for long-term data retention such as a flash memory, a magnetoresistive RAM, a ferroelectric RAM, a resistive RAM, a spin transfer torque-RAM (STT-RAM) and so on. The following discussion is regarding flash memory in particular as an example, but it is not intended to be limited thereto.

Figure 1:
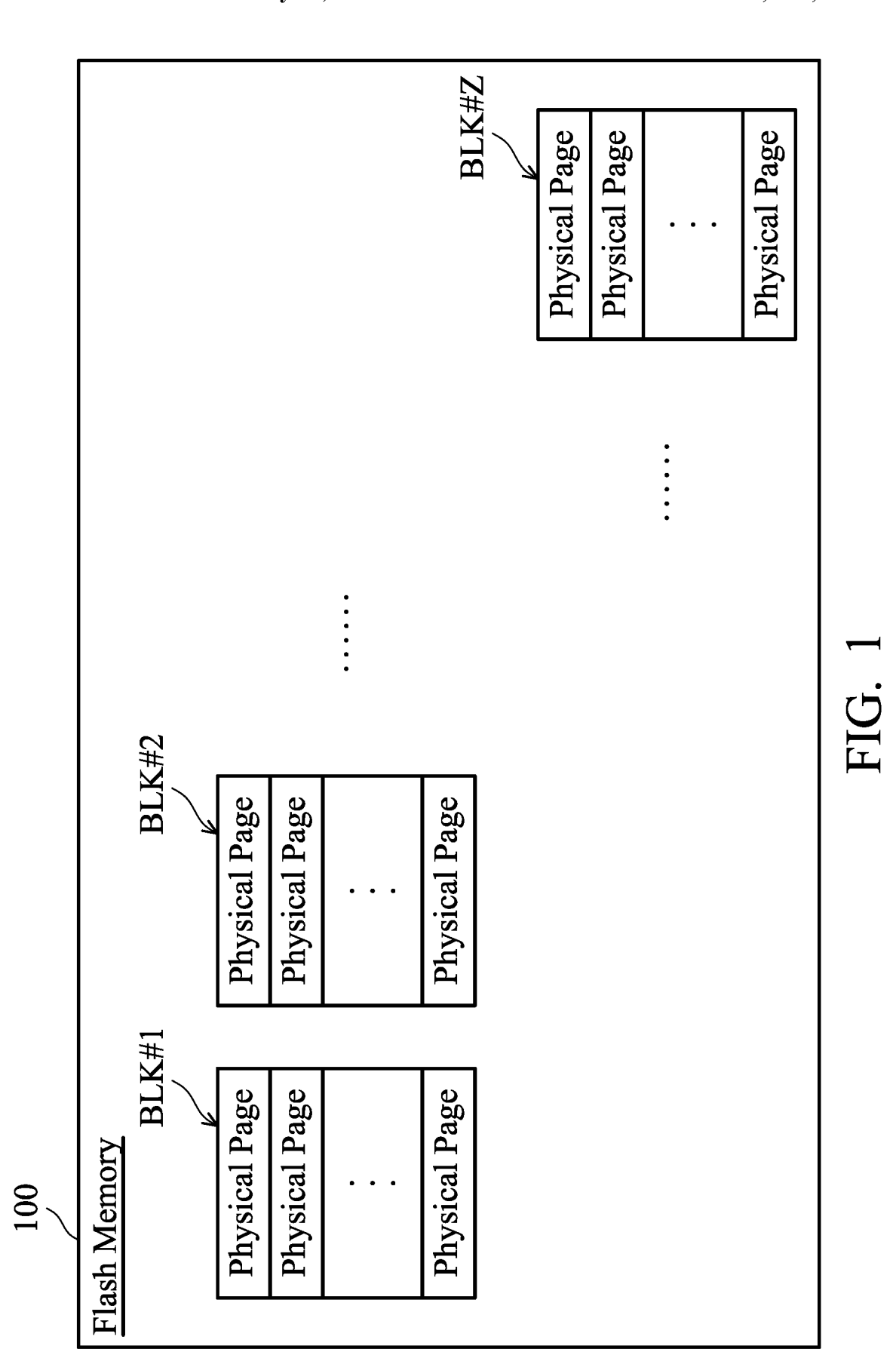
FIG. 1 illustrates the storage space of a flash memory 100.

FIG. 1 illustrates the storage space of a flash memory 100, which is divided into physical blocks BLK #1, BLK #2 . . . BLK #Z, etc., where Z is a positive integer. Each physical block includes a plurality of physical pages. For example, one physical block may include 256 physical pages. Each physical page may be allocated to store data of a predetermined length. For example, each physical page may be allocated to store 16 KB of data. Furthermore, there is a spare area for each physical page to store metadata. Multiple physical pages (for example, three physical pages) may share the same word line to be accessed or managed. Each physical page may be divided further into a plurality of memory cells. For example, one memory cell may be 4 KB. In an exemplary embodiment, each memory cell stores 4 KB of data with the corresponding logical block address LBA (e.g. LBA#0) stored in the aforementioned spare area. In another exemplary embodiment, each memory cell can store up to 8 sectors of 512B with the corresponding logical block addresses LBAs (e.g. LBA#0-LBA#7) stored in the aforementioned spare area. For simplicity, each memory cell discussed in the specification is used to store 4 KB of data, but the invention is not intended to be limited thereto. The mapping between LBA of data (arranged by a host) and a location/address (e.g. a physical address) allocated to store the data is recorded into a logical-to-physical mapping table L2P for data management. In an exemplary embodiment, mapping information is listed in the logical-to-physical mapping table L2P (hereinafter as "mapping table L2P") in the order of LBAs, and each entry of the L2P table records a physical block address (PBA), but the invention is not limited thereto. In another exemplary embodiment, mapping information is listed in the mapping table L2P according to the order that the data is stored into the flash memory. In addition to the mapping table L2P, other mapping tables may be established by the user for management of the data stored in the flash memory 100. The other mapping tables can further be used in rebuilding the mapping table L2P. In an exemplary embodiment, a physical-to-logical mapping table P2L (hereinafter as "mapping table P2L) is introduced to record the mapping between a location/address of data stored in the flash memory 100 and LBA of the data. That is, the mapping information listed in the mapping table P2L is built in the order of PBAs, and each entry of the mapping table P2L records a corresponding LBA.

The flash memory 100 is often used as a storage medium in today's data storage devices that can be implemented by a memory card, a USB flash device, an SSD and so on. In another exemplary embodiment, the flash memory 100 is packaged with a controller to form a multiple-chip package or an embedded flash-memory module such as an embedded Multi Media Card (eMMC) module.

When updating the data stored in the flash memory 100, the new data is written into a spare area rather than being rewritten over the storage space of the old data. The old data is invalidated. Frequent write operations can flood the storage space with invalid data. A garbage collection operation is introduced to operate the flash memory 100 to process the physical blocks containing a lot of invalid data.

Figure 2:
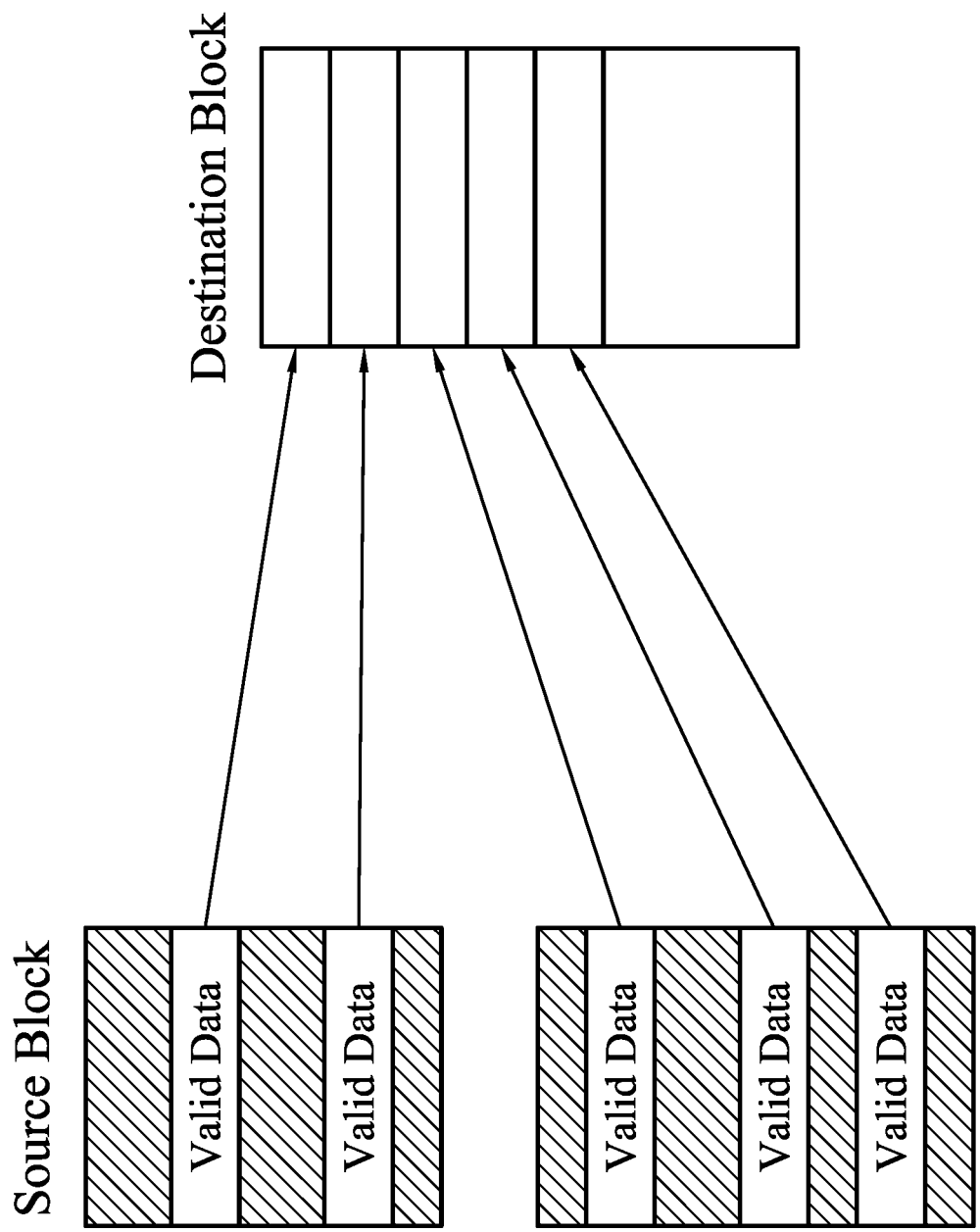
FIG. 2 illustrates the concept of garbage collection.

FIG. 2 illustrates the concept of garbage collection. The slashes indicate the invalid data. Valid data in source blocks is copied to a destination block. A source block whose valid data has been entirely copied to the destination block may be erased and redefined as a spare block. In another exemplary embodiment, a source block whose valid data has been copied to the destination block is redefined as a spare block and is not erased until the spare block is selected to store data again. To improve the operational efficiency, a garbage collection operation is segmented to be completed at separate time intervals and commands from a host can be inserted between the separate time intervals. In this manner, the system resources are not being used before a garbage collection operation is completed and the system performance is improved considerably.

Figure 3:
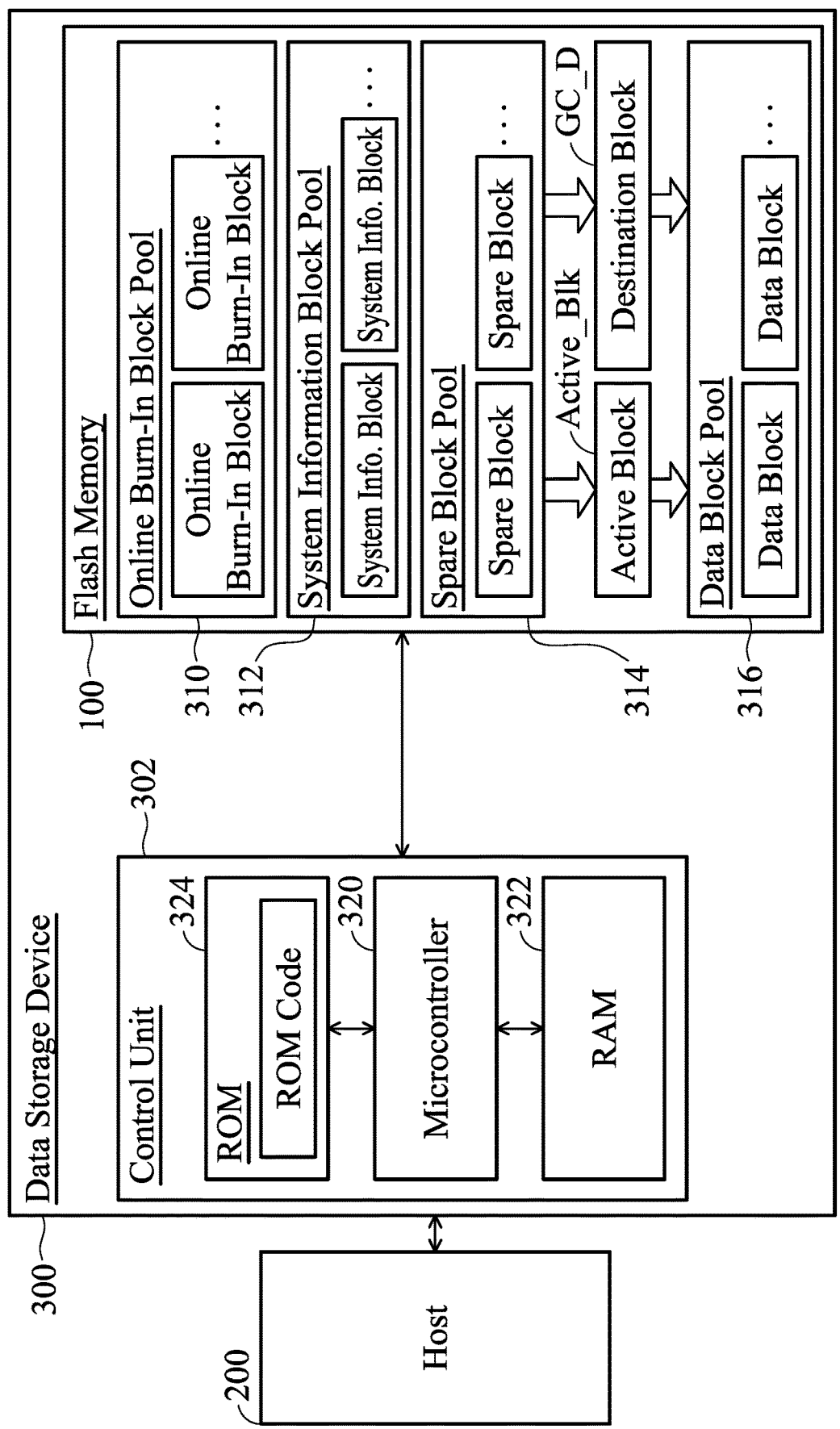
FIG. 3 is a block diagram depicting a data storage device 300 in accordance with an exemplary embodiment of the disclosure.

FIG. 3 is a block diagram depicting a data storage device 300 in accordance with an exemplary embodiment of the disclosure, which includes the flash memory 100 and a control unit 302. The control unit 302 is coupled between a host 200 and the flash memory 100 to operate the flash memory 100 in accordance with the commands issued by the host 200.

The space of the flash memory 100 is allocated to provide: an online burn-in block pool 310, a system information block pool 312, a spare block pool 314, a data block pool 316, an active block Active_Blk and a destination block GC_D. The destination block GC_D is allocated to collect valid data for garbage collection. The blocks within the online burn-in block pool 310 store in-system programming (ISP) code. The blocks within the system information block pool 312 store system information, such as a mapping table L2P. The active block Active_Blk is provided from the spare block pool 314 to receive data from the host 200. After the active block Active_Blk finishes receiving data, the active block Active_Blk is pushed into the data block pool 316 or redefined as a data block in the data block pool 316. The destination block GC_D is also provided from the spare block pool 314. Source blocks to be released by garbage collection may be selected from the data block pool 316. A source block whose valid data has been copied to the destination block GC_D may be redefined as a spare block.

The control unit 302 includes a microcontroller 320, a random access memory space 322 and a read-only memory 324. The random access memory space 322 may be implemented by a static random access memory (SRAM). In an exemplary embodiment, the random access memory space 322 and the microcontroller 320 may be fabricated on the same die. The read-only memory 324 stores ROM code. The microcontroller 320 operates by executing the ROM code obtained from the read-only memory 324 or/and the ISP code obtained from the online burn-in block pool 310 of the flash memory 100. For example, the microcontroller 320 has the functionality of a flash translation layer (FTL).

After the active block Active_Blk finishes receiving data and before the data from the active block Active_Blk is pushed into the data block pool 316 or redefined as a data block in the data block pool 316, the microcontroller 320 may store the mapping table P2L to the last segment of the active block Active_Blk, and the last segment may include one or more pages. When the microcontroller 320 generates the mapping table P2L, the microcontroller 320 may check again whether the data stored in the active block Active_Blk is valid. If the data stored in the active block Active_Blk is invalid, the logical address corresponding to the invalid data in the mapping table P2L may be set to a predefined value or a specific address such as 0xFFFFFFFF, wherein the predefined value or the specific address can be adjusted according to practical conditions.

When the microcontroller 320 starts to store data into the active block Active_Blk, or after the active block Active_Blk has finished receiving data and has become a data block, the microcontroller 320 monitors the amount of valid data in the active block Active_Blk or the data block, and records the total amount of valid data (i.e., valid data count). In an embodiment, the determination of the validity of data is based on a storage unit or a data page. When the data stored in the active block Active_Blk is invalid, the total amount of the valid data is reduced by 1. In an embodiment, while performing the garbage collection procedure, the microcontroller 320 selects the data block having the minimum amount of valid data from the data block pool 316 as the source block GC_S.

In an embodiment, the logical-to-physical mapping table L2P can be divided into a plurality of group mapping tables L2P_G such as group mapping tables L2P_G#0~L2P_G#4095. In an embodiment, the size of each group mapping table L2P_G may be equal to a data page or a storage unit for ease of storage and management of the group mapping table L2P_G, but the invention is not limited thereto. The microcontroller 320 may dynamically update the mapping table L2P or group mapping tables L2P_G using the random access memory 322. The microcontroller 320 may dynamically also update the active block Active_Blk and the destination block GC_D on the random access memory 322. For purposes of description, the logical-tophysical mapping table and the physical-to-logical mapping table are referred as mapping tables with different labels such as L2P and P2L.

While performing garbage collection, the control unit 302 may determine the validity of data before copying the valid data. In addition to obtaining the mapping table P2L_S associated with the source block GC_S, the control unit 302 uploads the mapping table L2P to the random access memory 322 or an external random access memory (e.g., DRAM). Since the memory space of the random access memory 322 or the external random access memory is limited, the microcontroller 320 cannot read the whole mapping table L2P to the random access memory 322 or the external random access memory, and thus the microcontroller 320 reads one or more group mapping tables L2P_G to the random access memory 322 or the external random access memory. For simplicity, the random access memory 322 is used as the storage medium of the mapping tables L2P_G, but the invention is not limited thereto. Additionally, the control unit 302 may also build a mapping table P2L_D of the destination block GC_D in the random access memory 322. When the destination is filled with data, the control unit 302 may write the mapping table P2L_D to the end of block (EOB) information of the destination block GC_D, and redefine the destination block GC_D as a data block.

Generally, in the conventional garbage collection procedure, while performing garbage collection on the data block such as the source block, the FTL has to determine whether the mapping relationship of the LBA associated with the PBA recorded in the mapping table P2L_S of the source block GC_S matches the mapping relationship of the PBA associated with the LBA, that is mapped from the mapping table P2L_S, recorded in the group mapping table L2P_G. If the mapping relationships match each other, it indicates that the data stored in the physical address of the source block GC_S is valid data. If the mapping relationships do not match, this indicates that the data stored in the physical address of the source block GC_S is invalid. Since data may be randomly stored in the source block GC_S, the physical addresses of the source block GC_S may correspond to a plurality of group mapping tables L2P_G, and one of the group mapping tables L2P_G may correspond to multiple physical addresses in the source block GC_S. When the random access memory 322 cannot store the whole mapping table L2P, the control unit 302 has to repeatedly replace the group mapping table L2P_G in the random access memory 322 while performing the garbage collection procedure. Since multiple physical addresses in the source block GC_S may correspond to the same group mapping table L2P_G, it may cause multiple accesses of the same group mapping table L2P_G, resulting in additional read time and lower system performance.

Figure 4:
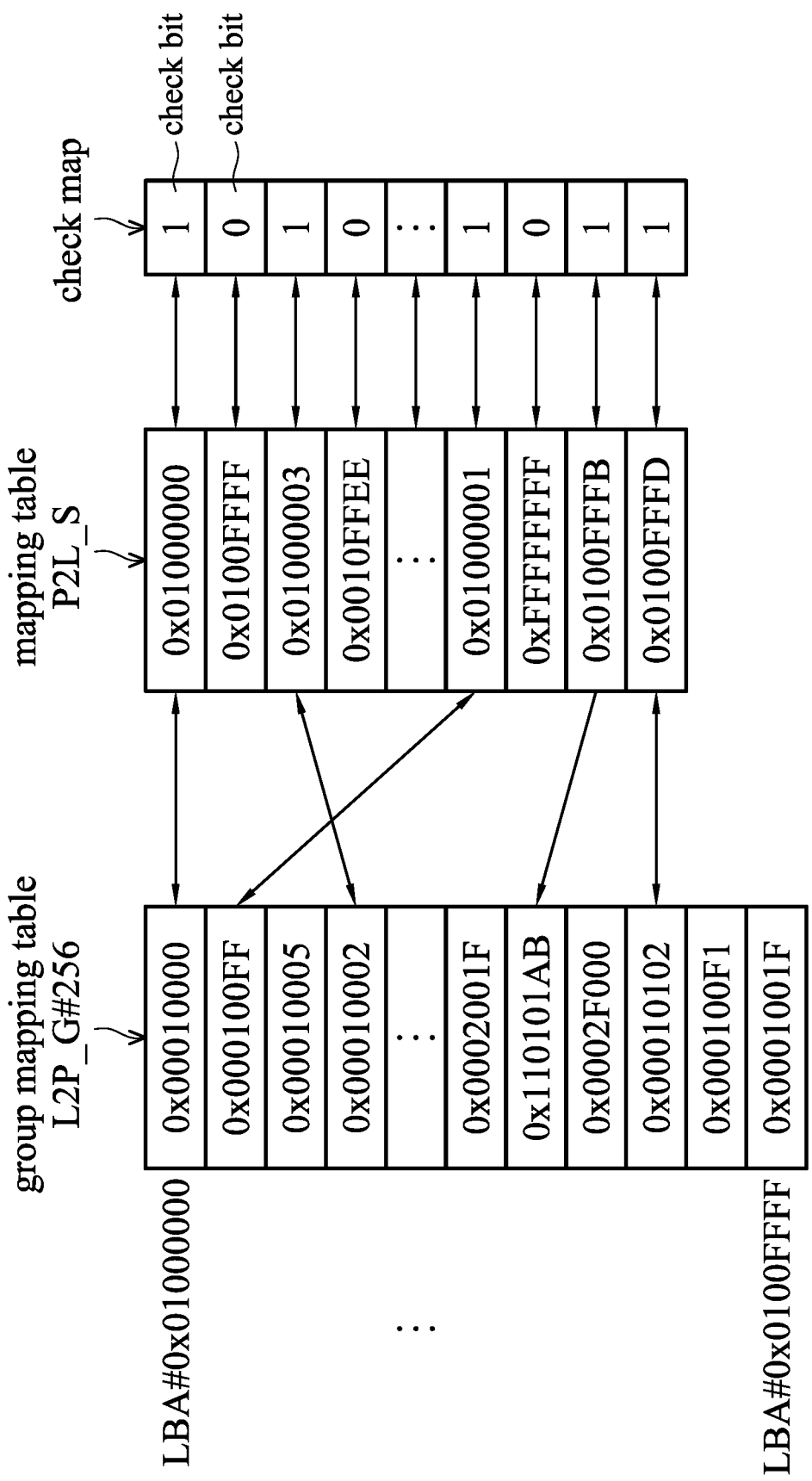
FIG. 4 is a diagram of relationships between the logical-to-physical mapping table, the physical-to-logical mapping table, and the check map in accordance with an embodiment of the invention.

FIG. 4 is a diagram of relationships between the logical-to-physical mapping table, the physical-to-logical mapping table, and the check map in accordance with an embodiment of the invention. As illustrated in FIG. 4, the control unit 302 may built a check map to label each entry, that can be mapped to the group mapping table L2P_G, in the mapping table P2L_S of the source block GC_S. The initial value of each check bit in the check map is 0. When the check bit of the corresponding entry is labeled, the check bit is changed to 1. As shown in FIG. 4, the content stored in the first entry of the mapping table P2L_S is a logical address LBA#0x01000000, and the logical address LBA#0x01000000 is one of the LBAs in the group mapping table L2P_G#256. After checking the first entry of the mapping table P2L_S, the check bit of the first entry in the check map is changed to 1. In addition, in order to avoid repeatedly accessing the same group mapping table L2P_G#256, the control unit 302 may label all entries, that can be mapped to the group mapping table L2P_G#256 in the mapping table P2L_S. Accordingly, in addition to the first entry of the mapping table P2L_S, other entries in the mapping table P2L_S that can be mapped to the group mapping table L2P_G#256 includes the logical addresses 0x01000003, 0x01000001, 0x0100FFFB, and 0x0100FFFD. The control unit 302 may label the check bits associated with the aforementioned logical addresses in the check map such as changing the check bits to 1. It should be noted that the purpose of the labeling procedure is to label all entries, that can be mapped to the group mapping table L2P_G, in the mapping table P2L_S to avoid repeated accesses of the same group mapping table L2P_G. The validity of the data stored in the physical address of the labeled entries can be confirmed until the data is to be moved to the destination block GC_D.

Referring to FIG. 4, each check bit in the check map corresponds to an entry of the mapping table P2L_S. In an embodiment, when the control unit 302 selects one of the group mapping tables L2P_G, the control unit 302 may select a non-dummy entry, that has content (i.e., LBA) not equal to 0xFFFFFFFF, of the mapping table P2L_S corresponding to the first check bit, the last check bit, or a random check bit being 0 in the check map. Then, the control unit 302 determines which group mapping table L2P_G should be read according to the content of the selected non-dummy entry. It should be understood that, when the logical addresses recorded by one or more entries in the mapping table P2L_S are 0xFFFFFFFF, these entries record invalid data and can be regarded as dummy entries. The dummy entries in the mapping table P2L_S will not be selected by the control unit 302, and the check bits in the check map corresponding to the dummy entries in the mapping table P2L_S will not be changed by the control unit 302 (i.e., the check bits remain unchanged such as 0). The aforementioned steps are performed repeatedly to check and label other non-dummy entries, that can be mapped to the group mapping table L2P_G in the mapping table P2L_S. When the check bits of the non-dummy entries in the mapping table P2L_S that can be mapped to the group mapping table L2P_G are all 1's, it indicates that the labeling procedure of the mapping table P2LS has completed and there is no valid data in the source block GC_S. Accordingly, the source block GC_S can be redefined as a spare block or erased directly.

During the garbage collection procedure, after each time the control unit 302 has labeled the check bit of a selected non-dummy entry in the mapping table P2L_S that can be mapped to the group mapping table L2P_G, the control unit 302 determines the validity of the data in the non-dummy entry in the mapping table P2L_S having a check bit of 1, thereby obtaining the non-dummy entries storing valid data. This kind of non-dummy entries can be regarded as valid entries. Then, the control unit 302 may copy the valid data stored in the physical addresses of the valid entries in the mapping table P2L_S to the destination block GC_D and updates the mapping table P2L_D. Accordingly, each group mapping table L2P_G can be read once at most rather than multiple times, thereby improving the efficiency of the garbage collection procedure.

The data validity is determined by matching the mapping relationships of the content in the group mapping table L2P_G and the mapping table P2L_S. For example, the content (LBA) of the first entry (e.g., a non-dummy entry) of the mapping table P2L_S is 0x01000000. The group mapping table L2P_G#256 records the physical addresses corresponding to the logical addresses from 0x01000000 to 0x0100FFFF. The content of the entry LBA#0x01000000 in the group mapping table L2P_G is PBA#0x00010000 that is mapped to the first entry of the mapping table P2L_S. Accordingly, for the first entry of the mapping table P2L_S, the mapping relationship of the group mapping table L2P_G and that of the mapping table P2L_S are consistent (i.e., match each other), and thus the data stored in the physical address (i.e., PBA#0x00010000) of the source block GC_S is valid data. Subsequently, the control unit 302 copies the valid data stored in the physical address associated with the first entry of the mapping table P2L_S to the destination block GC_D, and invalidates the content (i.e., LBA) of the first entry of the mapping table P2L_S such as changing the content of the first entry to 0xFFFFFFFF. Conversely, the content of one of the non-dummy entries in the mapping table P2L_S is 0x0100FFFB that is mapped to one of the entries in the group mapping table L2P_G#256, and the content of the mapped entry in the group mapping table L2P_G#256 is the physical address PBA#0x110101AB that cannot be mapped to any entry in the mapping table P2L_S. Accordingly, the mapping relationship in the group mapping table L2P_G is not consistent with that in the mapping table P2L_S, and it indicates that the data stored in the physical address of this entry of the source block GC_S is invalid data (i.e., labeled as a single-headed arrow). Meanwhile, the control unit 302 may invalidate the content of the entry in the mapping table P2L_S such as changing the content of the entry to 0xFFFFFFFF. Thus, the invalidated entry in the mapping table P2L_S can be regarded as an invalid entry or a dummy entry. In addition, if the content of the entry in the mapping table P2L_S has been invalidated (e.g., a dummy entry having content of 0xFFFFFFFF) while comparing the mapping relationships in the group mapping table L2P_G and the mapping table P2L_S, the control unit 302 may skip the comparison step associated with this entry, and does not label the check bit associated with this entry in the check map.

Figure 5A:
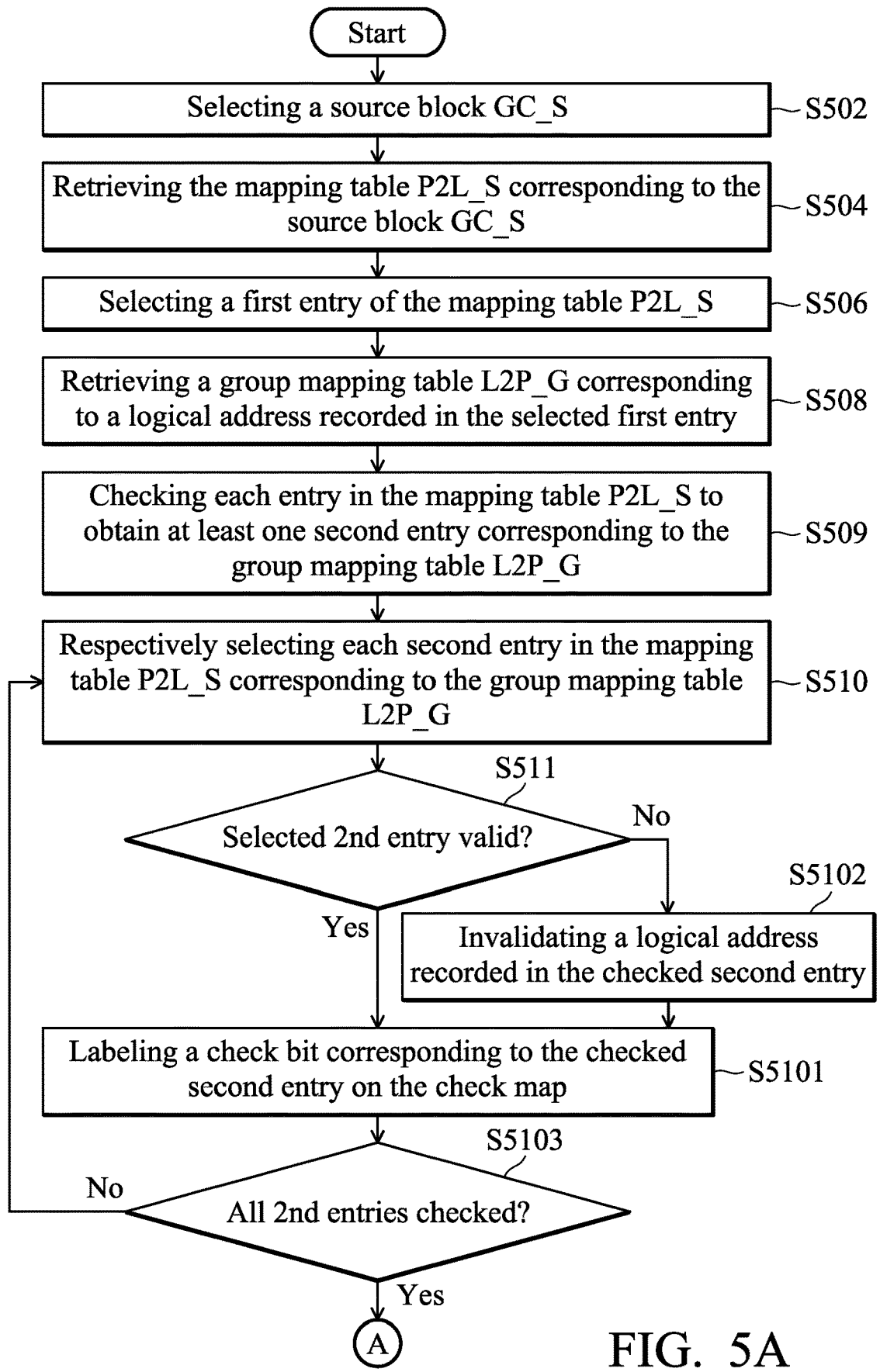
FIGS. 5A and 5B are portions of a flow chart of a partial garbage collection method in accordance with an embodiment of the invention.
Figure 5B:
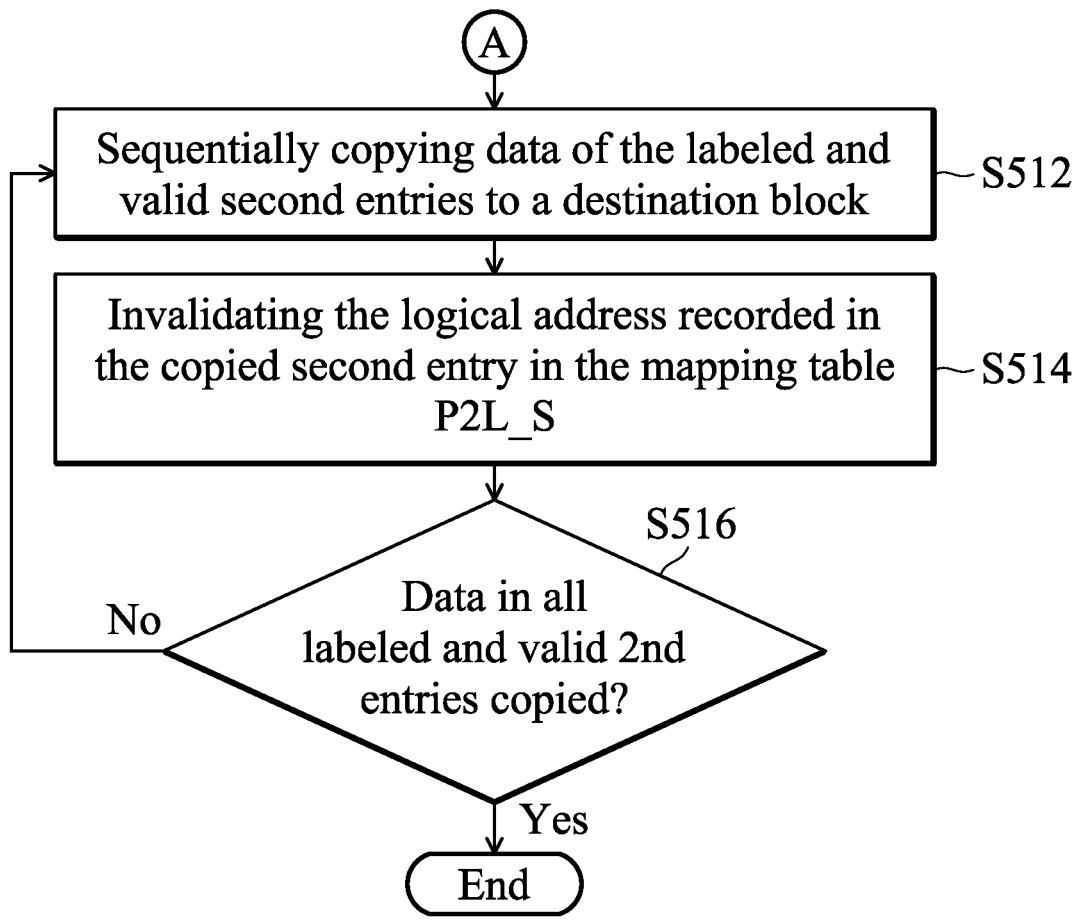

FIGS. 5A and 5B are portions of a flow chart of a partial garbage collection method in accordance with an embodiment of the invention. In step S502, a source block GC_S is selected. In step S504, a physical-to-logical mapping table P2L_S of the source block GCS is read. In an embodiment, the microcontroller 320 selects the data block having the minimum amount of valid data (e.g., the amount of valid pages in a data block) as the source block GC_S, and stores the physical-to-logical mapping table P2L_S of the source block GC_S into the random access memory 322.

In step S506, a first entry of the physical-to-logical mapping table P2L_S is selected. For example, the first entry may be a non-dummy entry, and that is, the logical address recorded by the first entry is not invalidated (e.g., not equal to 0xFFFFFFFF), and the check bit in the check map associated with the first entry is in the default value (e.g., 0). In addition, in an embodiment, the microcontroller 320 uses a pointer to point toward the selected physical address, and the pointer can be gradually increased or decreased to point toward another physical address, and thus the same physical address will not be selected repeatedly.

In step S508, a group logical-to-physical mapping table L2P_G corresponding to a logical address recorded in the first entry is retrieved. When the first entry (e.g., corresponding to the physical address 0x00010000) is selected, the group logical-to-physical mapping table L2P_G (e.g., L2P_G#256) can be retrieved according to the logical address (e.g., 0x01000000) recorded in the first entry of the physical-to-logical mapping table P2L_S. The microcontroller 320 may read the group logical-to-physical mapping table L2P_G#256 from the flash memory 100, and store the logical-to-physical mapping table L2P_G#256 in the random access memory 322.

In step S509, each entry in the physical-to-logical mapping table P2L_S is checked to obtain at least one second entry corresponding to the retrieved group logical-to-physical mapping table L2P_G, wherein the at least one second entry includes the first entry. For example, the microcontroller 320 may determine the entries in the physical-to-logical mapping table P2L_S corresponding to the retrieved group logical-to-physical mapping table L2P_G according to the logical address recorded in each entry of the physical-to-logical mapping table P2L_S.

In step S510, each of the second entries corresponding to the group logical-to-physical mapping table L2P_G is respectively selected. For example, each check bit in the check map may correspond to an entry of the physical-to-logical mapping table P2L_S, and the logical addresses in one or more non-dummy entries (e.g., the second entries) in the physical-to-logical mapping table P2L_S can be mapped to the group logical-to-physical mapping table L2P_G. The microcontroller 320 may respectively select each of the non-dummy entries (e.g., the second entries) in the physical-to-logical mapping table P2L_S corresponding to the group logical-to-physical mapping table. It should be noted that the microcontroller 320 does not repeatedly select any one of the second entries in the physical-to-logical mapping table P2L_S.

In step S511, it is checked whether the selected second entry is valid. If the selected second entry is valid, Step S5101 is performed. If the selected second entry is not valid, Step S5102 is performed. For example, the validity of the selected entry can be determined by matching the mapping relationship in the physical-to-logical mapping table P2L_S with that in the group logical-to-physical mapping table L2P_G, where the details can be referred to in the aforementioned embodiments. If the mapping relationships match, it indicates that the physical address of the checked second entry stores valid data, and the checked second entry can be regarded as a valid entry. If the mapping relationships do not match, it indicates that the physical address of the checked second entry does not store valid data. The method for checking the validity can be referred to in the embodiment of FIG. 4. For example, the physical address (e.g., PBA#0x00010000) and the content (e.g., LBA#0x01000000) of the selected second entry are compared with the physical address (e.g., PBA#0x00010000) and the logical address (LBA#0x01000000) of the group logical-to-physical table L2P_G#256 to determine whether the mapping relationships match each other. If the mapping relationships match each other, it indicates that the physical address of the selected second entry stores valid data. Otherwise, it indicates that the physical address of the selected second entry stores invalid data.

In Step S5101, a check bit corresponding to the checked second entry is labeled in the check map. For example, if the physical address of the selected second entry stores valid data, the microcontroller 320 may directly label the check bit corresponding to the checked second entry in the check map, such as setting the check bit to 1.

In Step S5102, a logical address recorded in the checked second entry is invalidated. For example, if the physical address corresponding to the selected second entry does not store valid data, the microcontroller 320 may invalidate the logical address recorded in the selected second entry, such as setting the logical address to 0xFFFFFFFF. Then, Step S5101 is performed to label the check bit corresponding to the checked second entry in the check map. Specifically, no matter whether the physical address corresponding to the checked second entry stores valid data or not, the check bit corresponding to the checked second entry is set to 1 by the microcontroller 320.

In Step S5103, it is determined whether all of the second entries in the physical-to-logical mapping table P2L_S corresponding to the group logical-to-physical mapping table L2P_G are checked. If all of the second entries are checked, Step S512 is performed. Otherwise, Step S510 is performed to select another second entry of the physical-to-logical mapping table P2L_S corresponding to the group logical-to-physical mapping table L2P_G.

In Step S512, data from labeled and valid second entries is sequentially copied to a destination block. Since the labeled and valid second entries in the physical-to-logical mapping table P2L_S can be obtained in the aforementioned steps, the data from labeled and valid second entries can be sequentially copied to the destination block GC_D. In the present invention, the microcontroller 320 may temporarily store the to-be-copied valid data in Step S514 into the random access memory 322 using a first-in first-out method, and the valid data is not written into the data pages of the destination block GC_D until the valid data has been stored to a predetermined amount, such as valid data from four valid second entries, thereby improving the data-writing efficiency and reducing the usage of data storage space.

In Step S514, the logical addresses of the copied second entries in the physical-to-logical mapping table P2L_S are invalidated. In an embodiment, after each time the microcontroller 320 has copied data from a checked and valid second entry to the destination block, the microcontroller 320 may invalidate the logical address recorded in the copied second entry, such as by changing the logical address to 0xFFFFFFFF.

In Step S516, it is determined whether data in all labeled and valid second entries in the physical-to-logical mapping table P2L_S has been copied. If the data has been copied, the flow ends. Otherwise, Step S512 is performed.

Additionally, after each time that Step S512 is performed, the microcontroller 320 may update the new physical address (e.g., the destination block GC_D) of the copied valid data to the group logical-to-physical mapping table L2P_G. In an alternative embodiment, before the partial garbage collection method ends, the microcontroller 320 may sequentially update the new physical address of the valid data to the group logical-to-physical mapping table L2P_G. In yet another embodiment, after the destination block GC_D is filled with data, the microcontroller 320 may sequentially update the new physical address of the valid data to the group logical-to-physical mapping table L2P_G.

Assuming that the logical addresses recorded in different entries in the physical-to-logical mapping table P2L_S of the source block GC_S correspond to multiple group logical-to-physical mapping tables L2P_G, the partial garbage collection method in the embodiment of FIG. 5 can be repeatedly performed to copy the valid data stored in the source block GC_S to the destination block GC_D. In addition, each of the logical-to-physical mapping tables L2P_G corresponding to the source block GC_S can be read once at most, thereby improving the efficiency of garbage collection.

Figure 6A:
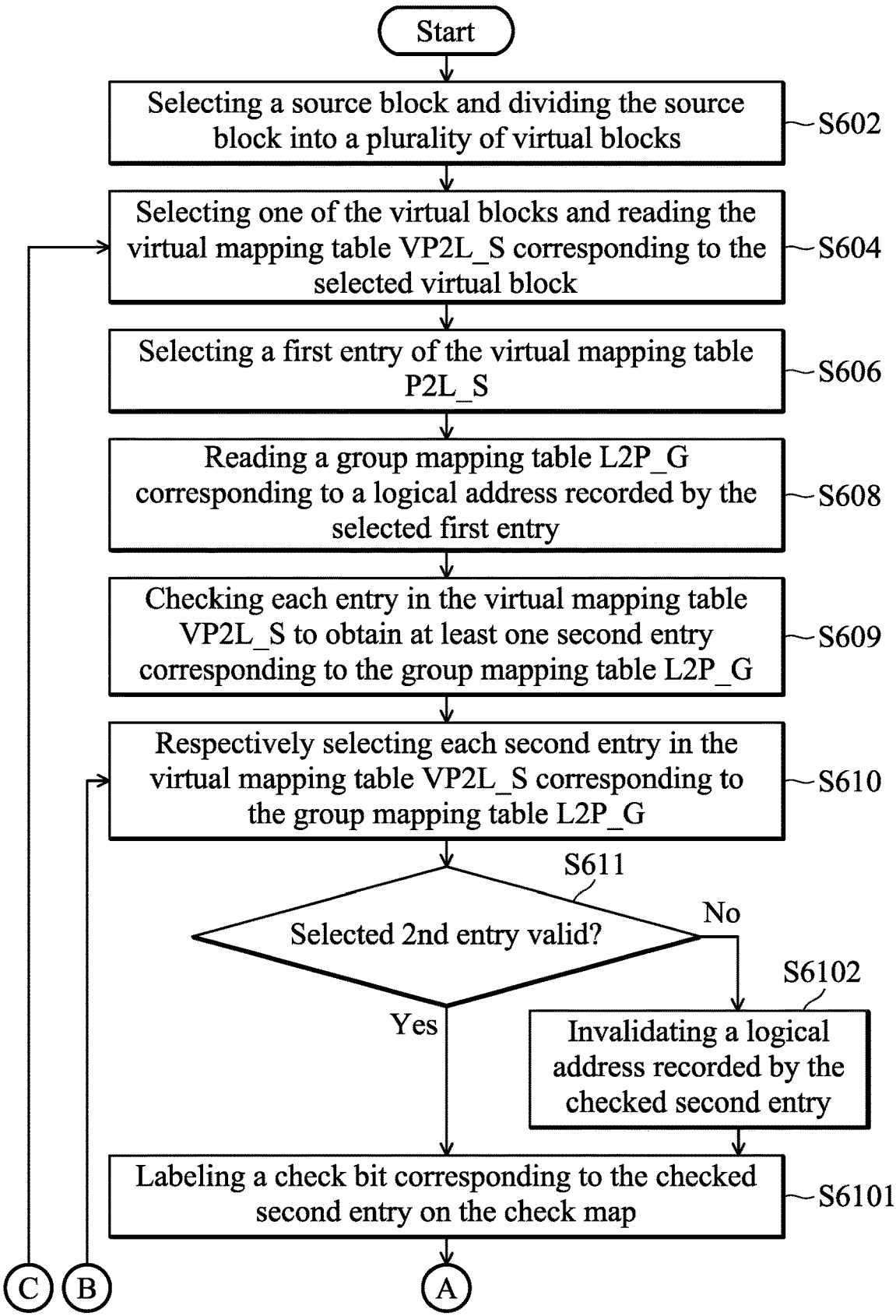
FIGS. 6A and 6B are portions of a flow chart of a partial garbage collection method for virtual blocks in accordance with an embodiment of the invention.
Figure 6B:
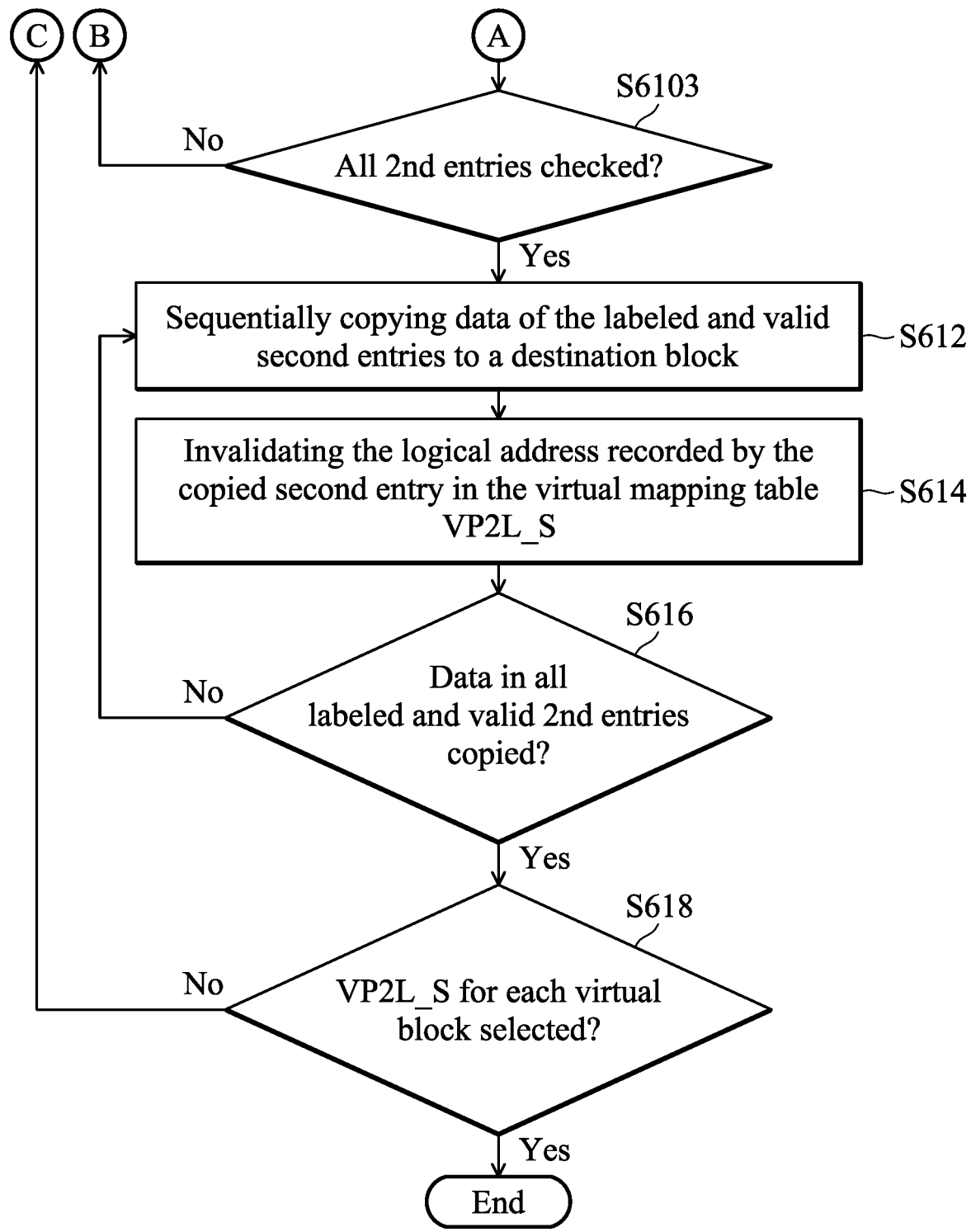

Furthermore, the microcontroller 320 may divide the source block GC_S into a plurality of virtual blocks to simplify data management of garbage collection. FIGS. 6A and 6B are portions of a flow chart of a partial garbage collection method for virtual blocks in accordance with an embodiment of the invention. The partial garbage collection method in the present invention can be applied to virtual blocks, and the details will be described in the following section with FIGS. 6A and 6B.

In step S602, a source block is selected and the selected source block is divided into a plurality of virtual blocks. For example, the microcontroller 320 may divide the source block GC_S into a plurality of virtual blocks, such as four virtual blocks, and each virtual block has a corresponding virtual mapping table VP2L_S. In an embodiment, the microcontroller 320 records the virtual valid data count in each virtual block. For example, the virtual valid data count indicates the number of virtual valid pages in the virtual block.

In step S604, a virtual physical-to-logical mapping table VP2L_S corresponding to one of the virtual blocks of the source block is selected. In an embodiment, the microcontroller 320 sequentially selects one of the virtual blocks of the source block.

In step S606, a first entry of the virtual physical-to-logical mapping table VP2L_S is selected. Steps S604 and S606 are similar to steps S502 and S504, and the primary difference between steps S604 and S504 is that the virtual physical-to-logical mapping table VP2L_S of one of the virtual blocks of the source block is selected in step S604.

In step S608, a group logical-to-physical mapping table L2P_G corresponding to a logical address recorded in the selected first entry is retrieved. Step 608 is similar to step S508, and thus the details will be omitted here.

In step S609, each entry in the virtual physical-to-logical mapping table VP2L_S is checked to obtain at least one second entry corresponding to the group logical-to-physical mapping table L2P_G. Step 609 is similar to step S509, and thus the details will be omitted here.

In step S610, each second entry in the virtual physical-to-logical mapping table VP2L_S corresponding to the group logical-to-physical mapping table L2P_G is respectively selected. Step 610 is similar to step S510, and thus the details will be omitted here.

In Step S611, it is checked whether the selected second entry is valid. Step 611 is similar to Step S511, and thus the details will be omitted here.

In Step S6101, a check bit corresponding to the checked second entry is labeled in the check map. For example, if the physical address corresponding to the selected second entry stores valid data, the microcontroller 320 may directly label the check bit corresponding to the checked second entry in the check map, such as setting the check bit to 1.

In Step S6102, a logical address recorded in the checked second entry is invalidated. For example, if the physical address corresponding to the selected second entry does not store valid data, the microcontroller 320 may invalidate the logical address recorded in the selected second entry, such as setting the logical address to 0xFFFFFFFF. Then, Step S6101 is performed to label the check bit of the checked second entry in the check map. Specifically, no matter whether the physical address corresponding to the checked second entry stores valid data or not, the check bit corresponding to the checked second entry is set to 1 by the microcontroller 320.

In Step S6103, it is determined whether all second entries in the virtual physical-to-logical mapping table VP2L_S corresponding to the group logical-to-physical mapping table L2P_G are checked. If all second entries are checked, Step S612 is performed. Otherwise, Step S610 is performed to select another second entry in the in the virtual physical-to-logical mapping table VP2L_S corresponding to the group logical-to-physical mapping table L2P_G.

In Step S612, data from the labeled and valid second entries in the virtual physical-to-logical mapping table VP2L_S is sequentially copied to a destination block GC_D. Step S612 is similar to Step S512, with the primary difference between steps S612 and S512 being that the data from labeled and valid second entries in the virtual physical-to-logical mapping table VP2L_S is copied to a destination block GC_D in Step S612.

In Step S614, the logical addresses of the copied second entries in the virtual physical-to-logical mapping table VP2L_S are invalidated. Step S614 is similar to step S514, and the primary difference between the steps S614 and S514 is that the logical addresses of the copied second entries in the virtual physical-to-logical mapping table VP2L_S are invalidated in Step S614.

In Step S616, it is determined whether data in all labeled and valid second entries in the virtual physical-to-logical mapping table VP2L_S has been copied. If the data has been copied, Step S618 is performed. Otherwise, Step S612 is performed.

In Step S618, it is determined whether the virtual physical-to-logical mapping tables VP2L_S of all virtual blocks in the source block have been selected. If so, the flow of the partial garbage collection method ends. Otherwise, Step S604 is performed to select the virtual physical-to-logical mapping table VP2L_S of a virtual block that has not been selected yet.

In addition, after each time that Step S612 is performed, the microcontroller 320 may update the new physical address (e.g., the destination block GC_D) of the copied valid data to the group logical-to-physical mapping table L2P_G. In an alternative embodiment, before the partial garbage collection method ends, the microcontroller 320 may sequentially update the new physical address of the valid data to the group logical-to-physical mapping table L2P_G.

Figure 7:
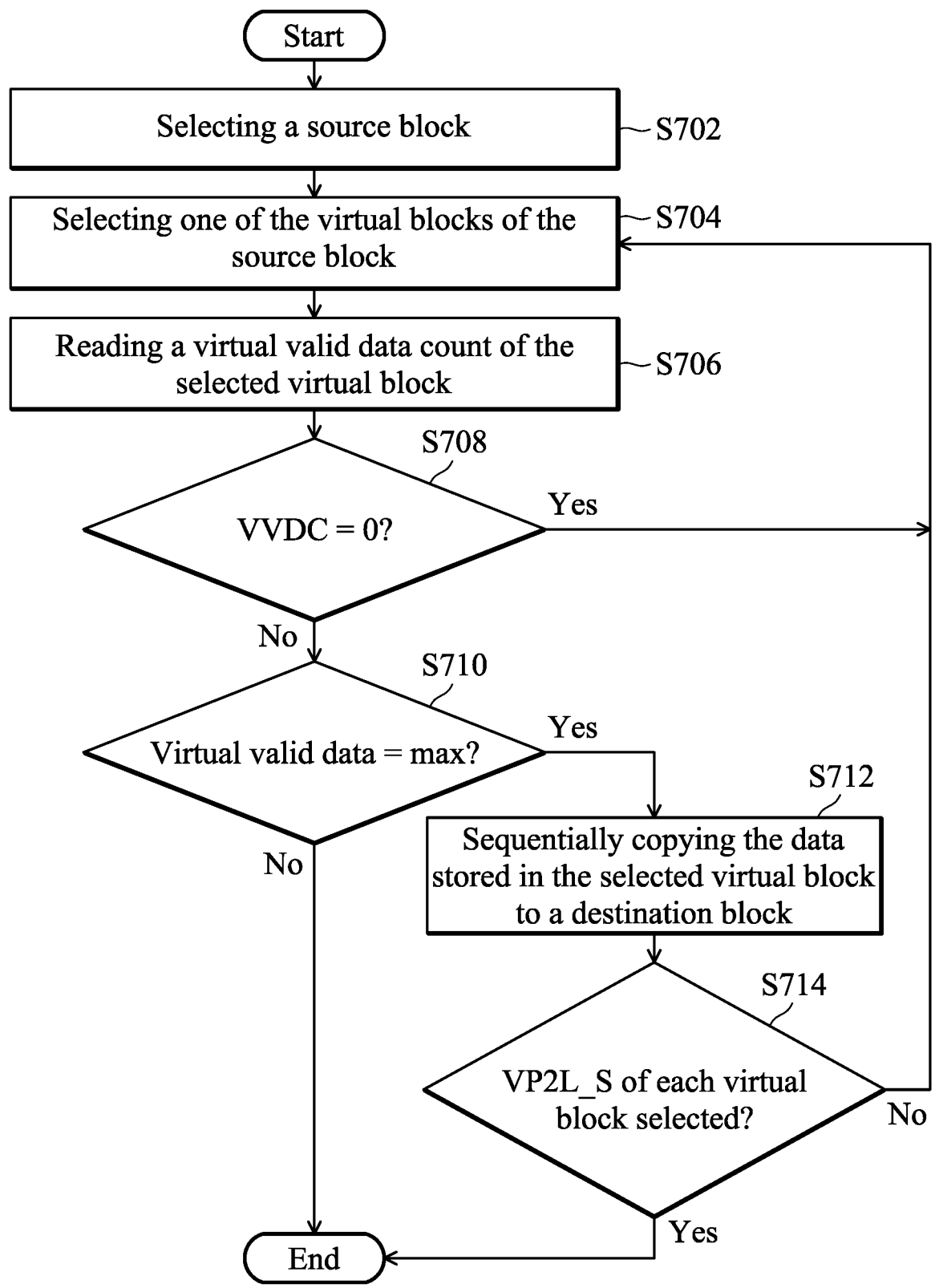
FIG. 7 is a flow chart of a partial garbage collection method for virtual blocks in accordance with another embodiment of the invention.

Furthermore, the partial garbage collection method in the embodiment of FIG. 6 can be simplified with regard to an extreme example such as all data in a virtual block of the source block is valid or invalid. The flow of the simplified method is shown in FIG. 7 and will be described in the following section.

In Step S702, a source block is selected and the selected source block is divided into a plurality of virtual blocks. Step S702 is similar to Step S602.

In Step S704, one of the virtual blocks of the source block is selected.

In Step S706, the virtual valid data count of the selected virtual block is read. For example, the virtual valid data count (i.e., VVDC) indicates the total amount of virtual valid pages of the virtual block, and can be regarded as a virtual valid page count (i.e., VVPC).

In Step S708, it is determined whether the virtual valid data count is equal to 0. If so, Step S704 is performed to select another virtual block that has not been selected yet. Otherwise, Step S710 is performed.

In Step S710, it is determined whether the virtual valid data count is equal to a maximum value MAX. If so, Step S712 is performed. Otherwise, the flow of the partial garbage collection method ends. For example, the maximum value MAX of the virtual valid data count indicates the maximum storage size of the virtual block (e.g., the number of all pages of the virtual block). If the determination of Step S710 is yes, it indicates that all data stored in the virtual block is valid data.

In Step S712, the data stored in the virtual block is sequentially copied to a destination block.

In Step S714, it is determined whether all the virtual physical-to-logical mapping tables VP2L_S of the virtual blocks of the source block have been selected. If so, the flow of the partial garbage collection method ends. Otherwise, Step S704 is performed to select the virtual physical-to-logical mapping table VP2L_S of another virtual block that has not been selected yet.

In addition, after each time that Step S714 is performed, the microcontroller 320 may update the new physical address (e.g., the destination block GC_D) of the copied valid data to the group logical-to-physical mapping table L2P_G. In an alternative embodiment, before the partial garbage collection method ends, the microcontroller 320 may sequentially update the new physical address of the valid data to the group logical-to-physical mapping table L2P_G.

In view of the above, a data storage device and a partial garbage collection method are provided in the present invention. The data storage device and the partial garbage collection method are capable of determining the validity of each physical address of the source block during the garbage collection procedure, and thus repeated access of the same group logical-to-physical mapping table L2P_G can be avoided during the garbage collection procedure, thereby improving the performance and efficiency of garbage collection.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
    a flash memory, comprising a plurality of physical blocks; and
    a microcontroller, selecting one source block and one destination block from the plurality of physical blocks, and performing a garbage collection operation according to a check map corresponding to the selected source block to copy data stored in one or more valid physical addresses of the source block to the selected destination block,
    wherein the check map records whether a mapping relationship of each physical address in a physical-to-logical mapping table corresponding to the source block has been compared to that of one or more corresponding group logical-to-physical tables,
    wherein the microcontroller selects a first entry of a physical-to-logical mapping table of the source block, and loads a group logical-to-physical mapping table, corresponding to a specific logic address recorded in the first entry, to a random access memory, wherein the first entry is a non-dummy entry.

2. The data storage device as claimed in claim 1, wherein the microcontroller checks a plurality of entries in the physical-to-logical mapping table to obtain at least one second entry corresponding to the group logical-to-physical mapping table, wherein the at least one second entry comprises the first entry.

3. The data storage device as claimed in claim 2, wherein the microcontroller respectively selects each second entry corresponding to the group logical-to-physical mapping table from the physical-to-logical mapping table, and determines whether the selected second entry is valid.

4. The data storage device as claimed in claim 3, wherein:
when the selected second entry is valid, the microcontroller labels a check bit corresponding to the checked second entry in the check map; and
when the selected second entry is invalid, the microcontroller invalidates a logical address recorded in the checked second entry, and labels the check bit corresponding to the checked second entry in the check map.

5. The data storage device as claimed in claim 4, wherein when each second entry in the physical-to-logical mapping table has been checked, the microcontroller sequentially copies data from the labeled and valid second entries in the physical-to-logical mapping table to the destination block, and invalidates the logical address recorded in the at least one second entry having the copied data.

6. The data storage device as claimed in claim 5, wherein the microcontroller writes the data from the at least one second entry to the destination block using a first-in first-out method to complete the garbage collection operation.

7. The data storage device as claimed in claim 5, wherein the microcontroller does not write the data from the at least one second entry to the destination block until a predetermined of data from the at least one second entry has been stored, thereby completing the garbage collection operation.

8. A data storage device, comprising:
a flash memory, comprising a plurality of physical blocks; and
a microcontroller, selecting one source block and one destination block from the plurality of physical blocks, and dividing the source block into a plurality of virtual blocks,
wherein the microcontroller selects one of the virtual blocks, and performs a garbage collection operation according to a check map corresponding to the selected virtual block to copy data, stored in one or more valid physical addresses of the virtual block, to the selected destination block,
wherein the check map records whether a mapping relationship of each physical address in a virtual physical-to-logical mapping table corresponding to the selected virtual block of the source block has been compared to that of one or more corresponding group logical-to-physical tables,
wherein the microcontroller selects a first entry of the virtual physical-to-logical mapping table of the selected virtual block, and loads a group logical-to-physical mapping table, corresponding to a specific logic address recorded in the first entry, to a random access memory, wherein the first entry is a non-dummy entry.

9. The data storage device as claimed in claim 8, wherein the microcontroller checks a plurality of entries in the virtual physical-to-logical mapping table to obtain at least one second entry corresponding to the group logical-to-physical mapping table, wherein the at least one second entry comprises the first entry.

10. The data storage device as claimed in claim 9, wherein the microcontroller respectively selects each second entry corresponding to the group logical-to-physical mapping table from the virtual physical-to-logical mapping table, and determines whether the selected second entry is valid.

11. The data storage device as claimed in claim 10, wherein:
when the selected second entry is valid, the microcontroller labels a check bit corresponding to the checked second entry in the check map; and
when the selected second entry is invalid, the microcontroller invalidates a logical address recorded in the checked second entry, and labels the check bit corresponding to the checked second entry in the check map.

12. The data storage device as claimed in claim 11, wherein when each second entry in the virtual physical-to-logical mapping table has been checked, the microcontroller sequentially copies data from the labeled and valid second entries in the virtual physical-to-logical mapping table to the destination block, and invalidates the logical address recorded in the at least one second entry having the copied data.

13. The data storage device as claimed in claim 12, wherein the microcontroller writes the data from the at least one second entry to the destination block using a first-in first-out method to complete the garbage collection operation.

14. The data storage device as claimed in claim 12, wherein the microcontroller does not write the data from the at least one second entry to the destination block until a predetermined amount of data from the at least one second entry has been stored, thereby completing the garbage collection operation.

15. A data storage device, comprising:
a flash memory, comprising a plurality of physical blocks; and
a microcontroller, selecting one source block and one destination block from the plurality of physical blocks, and dividing the source block into a plurality of virtual blocks,
wherein the microcontroller selects one of the virtual blocks, and reads a virtual valid data count of the selected virtual block,
wherein when the microcontroller determines that the virtual valid data count of the selected virtual block is equal to a maximum storage size of the selected virtual block, the microcontroller performs a garbage collection operation to copy data, stored in a plurality of physical addresses of the selected virtual block, to the selected destination block.

16. The data storage device as claimed in claim 15, wherein when the microcontroller determines that the virtual valid data count of the selected virtual block is equal to 0, the microcontroller ends the garbage collection operation.

* * * * *